United States Patent
Chang et al.

(10) Patent No.: US 7,460,455 B2
(45) Date of Patent: Dec. 2, 2008

(54) METHOD FOR DETERMINING RELATIONSHIP BETWEEN DIFFERENCE OF OBJECT LENS LOCATION AND DRIVING CONTROL EFFORT IN OPTICAL STORAGE DEVICE AND APPARATUS THEREOF

(75) Inventors: Hung-Hsiang Chang, Taipei-Hsien (TW); Fu-Shan Wang, Tai-Nan (TW)

(73) Assignee: Mediatek Incorporation, Science-Based Industrial Park, Hsin-Chu Hsien (TW)

( * ) Notice: Subject to any disclaimer, the term of this patent is extended or adjusted under 35 U.S.C. 154(b) by 530 days.

(21) Appl. No.: 10/904,872

(22) Filed: Dec. 1, 2004

(65) Prior Publication Data

US 2005/0135216 A1     Jun. 23, 2005

(30) Foreign Application Priority Data

Dec. 2, 2003    (TW) .............................. 92133914 A

(51) Int. Cl.
     *G11B 7/00*      (2006.01)
(52) U.S. Cl. ............... 369/53.25; 369/44.29; 369/44.25
(58) Field of Classification Search ............. 369/53.25, 369/44.29, 44.25
See application file for complete search history.

(56) References Cited

U.S. PATENT DOCUMENTS

| | | | |
|---|---|---|---|
| 5,831,952 A * | 11/1998 | Yamada et al. | 369/53.22 |
| 6,674,696 B1* | 1/2004 | Ichimura et al. | 369/44.35 |
| 2005/0041541 A1* | 2/2005 | Tateishi et al. | 369/44.27 |
| 2005/0052977 A1* | 3/2005 | Sun | 369/53.23 |

* cited by examiner

*Primary Examiner*—Tan X Dinh
*Assistant Examiner*—Van N Chow
(74) *Attorney, Agent, or Firm*—Winston Hsu

(57) ABSTRACT

A method used in an optical storage device having a pickup head. The pickup head includes an object lens, a first and a second light source. The object lens focuses the laser light generated by the first or the second light source onto a first or a second focal point. A driving control effort is used to change the location of the object lens. The method includes the following steps: providing the driving control effort to move the object lens; measuring a first parameter when the first focal point passes through a predetermined layer of an optical disc; measuring a second parameter when the second focal point passes through the predetermined layer of the optical disc; and (d) determining the relationship between the difference of object lens location and the driving control effort according to the predetermined distance, the first parameter, and the second parameter.

22 Claims, 6 Drawing Sheets

METHOD FOR DETERMINING RELATIONSHIP BETWEEN DIFFERENCE OF OBJECT LENS LOCATION AND DRIVING CONTROL EFFORT IN OPTICAL STORAGE DEVICE AND APPARATUS THEREOF

BACKGROUND

The present invention relates to an optical storage device, and more particularly, to a method for determining a relationship between difference of object lens location and a driving control effort in an optical storage device and apparatus thereof.

A personal computer (PC) or other electronic system often includes an optical storage device, which has become a widely applied storage medium. FIG. 1 shows a block diagram of a conventional optical storage device 100. In FIG. 1, the optical storage device 100 comprises a spindle motor 110, an optical disc 120, a pickup head 130, a signal processing unit 140, a focusing controller 150, a micro controller unit (MCU) 160, and a power driver 170. The optical disc 120 is of CD or DVD type, which contains at least two layers: a surface layer and a reflective layer. The surface layer is defined as the disc surface at the side towards to the pickup head. The reflective layer is defined as the junction layer between the protective material and metal surface on which the information pits is located. Normally, there is one DVD laser diode (LD) and one CD laser diode installed on the pickup head 130. An object lens is used to focus the laser light generate by the DVD laser diode or the CD laser diode onto the optical disc 120, then the pickup head 130 can reproduce the data stored on the optical disc 120 according to received reflected light. A focusing actuator, also called a focusing coil, of the pickup head moves the object lens perpendicular to the surface of the optical disc 120 according to a driving control effort (in this example, the driving control effort is a driving voltage) generated by the power driver 170, hence the location of a focal point of the laser light generated by one of the LDs can be controlled.

When controlling the focal point of the laser light to jump between different layers of the optical disc 120, or processing an optical disc identification procedure, the driving voltage used to drive the focusing actuator would continuously be altered. By altering the driving voltage, the object lens can be moved, hence the location of focal point of the laser light can be controlled. The relationship between the moving distance of the object lens and the difference of two values of the driving voltage can be expressed as a displacement gain, wherein the units of the displacement gain is distance/voltage. The displacement gain can also be thought of as a DC sensitivity of the focusing actuator.

Take the optical disc identification procedure as an example. By measuring the time for the focal point of the laser light generated by one of the LDs to move between a surface layer and a reflective layer of the optical disc 120, or by measuring the voltage change of the driving voltage, the distance between the surface layer and the reflective layer can be determined according to the measuring result and a predetermined displacement gain of the focusing actuator. Roughly speaking, an optical disc with shorter distance between the surface layer and the reflective layer will be identified as a DVD type optical disc. An optical disc with longer distance between the surface layer and the reflective layer will be identified as a CD type optical disc.

Optical storage devices of the prior art use a fixed value as the predetermined displacement gain of the focusing actuator, and use the fixed displacement gain as a parameter to process procedures such as the layer jump procedure or the optical disc identification procedure. However, because there are always slight differences between each focusing actuator, it is almost impossible to manufacture optical storage devices having a common and exact value on the displacement gain. Hence, it's apparent that using a common and fixed value as the displacement gain for each optical storage device is not the best solution.

SUMMARY OF INVENTION

It is therefore an objective of the present invention to provide a method for determining a relationship between difference of object lens location and a driving control effort in an optical storage device and apparatus thereof.

According to an embodiment of the present invention, a method used in an optical storage device is disclosed. The optical storage device includes a pickup head. The pickup head includes an object lens, a first light source, and a second light source. The object lens focuses laser light generated by the first light source onto a first focal point or focuses laser light generated by the second light source onto a second focal point. The first focal point is a predetermined distance from the second focal point. A driving control effort is used to change the location of the object lens. The method is used to determine a relationship between the difference of object lens location and the driving control effort, and comprises the following steps: (a) providing the driving control effort to move the object lens; (b) measuring a first parameter when the first focal point passes through a predetermined layer of an optical disc; (c) measuring a second parameter when the second focal point passes through the predetermined layer of the optical disc; and (d) determining the relationship between the difference of object lens location and the driving control effort according to the predetermined distance, the first parameter, and the second parameter.

According to another embodiment of the present invention, a method used in an optical storage device is disclosed. The optical storage device includes a pickup head. The pickup head includes an object lens and a light source. The object lens focuses laser light generated by the light source onto a focal point. A driving control effort is used to change the location of the object lens. The method is used to determine a relationship between the difference of object lens location and the driving control effort, and comprises the following steps: (a) providing the driving control effort to move the object lens; (b) measuring a first parameter when a signal reaches a first state; (c) measuring a second parameter when the signal reaches a second state; and (d) determining the relationship between the difference of object lens location and the driving control effort according to a predetermined distance, the first parameter, and the second parameter.

According to another embodiment of the present invention, an optical storage device is disclosed. The optical storage device comprises a pickup head, a signal processing unit, a power driver, and a determining unit. The pickup head comprises an object lens and a focusing actuator for controlling the location of the object lens according to a driving control effort. The signal processing unit is connected to the pickup head. The power driver is connected to the focusing actuator for generating the driving control effort. The determining unit is connected to the signal processing unit and the power driver for determining the relationship between the difference of object lens location and the driving control effort.

It is an advantage of the present invention that an unique value representing the relationship between the difference of object lens location and the driving control effort could be determined accurately. The measured relationship could be used to calibrate the optical storage device; hence the controlling accuracy of the optical storage device is enhanced.

These and other objectives of the present invention will no doubt become obvious to those of ordinary skill in the art after reading the following detailed description of the preferred embodiment that is illustrated in the various figures and drawings.

DETAILED DESCRIPTION

An idea of the present invention is to measure the displacement gain (i.e. a relationship between the difference of object lens location and a driving control effort) by using a specific distance as a reference basis. In the following description, the method disclosed by the present invention is used in an optical storage device containing a CD laser diode (which is a first light source of the optical storage device), a DVD laser diode (which is a second light source of the optical storage device), and an object lens. The object lens is used to focus the laser light generated by the CD laser diode onto a first focal point or focus the laser light generated by the DVD laser diode onto a second focal point. A driving control effort is used to control the location of the object lens (in this example, the driving control effort is a driving voltage, however, the driving control effort could also be a driving current or other kind of control means).

With the progression of lens manufacturing technology, the focal length of an object lens corresponding to the CD laser light, i.e., the distance between the first focal point and the object lens, can have a highly accurate value. The focal length of the object lens corresponding to the DVD laser light, i.e., the distance between the second focal point and the object lens, can also have a highly accurate value. Hence, the distance between the first focal point and the second focal point, which is hereafter referred to a first distance WD_delta, which can be derived from the characteristics of pickup head, is also a substantially fixed value. In the first embodiment of the present invention, the first distance WD_delta is used as the abovementioned specific distance.

Figure 1:
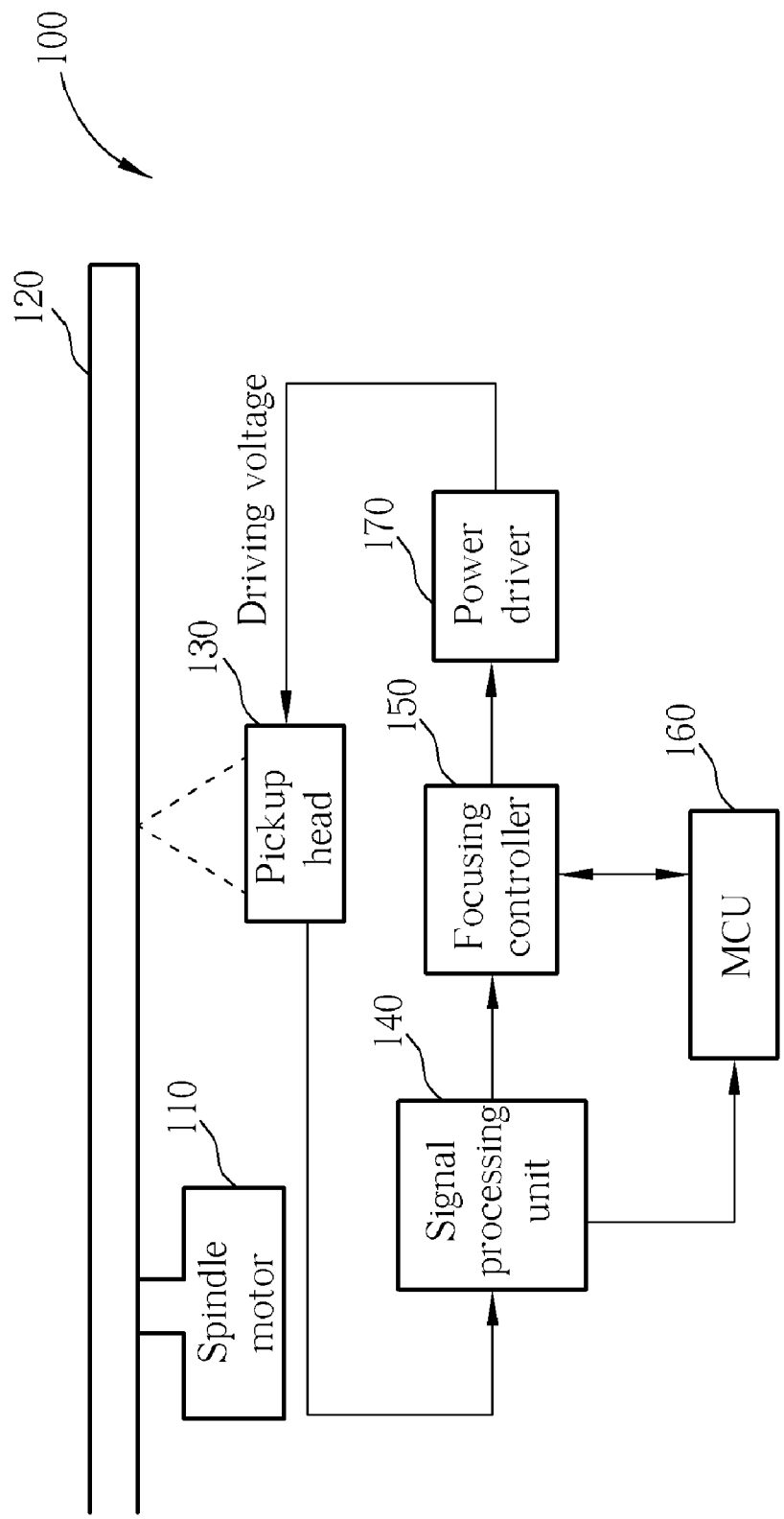
FIG. 1 is a block diagram of a conventional optical storage device.
Figure 2:
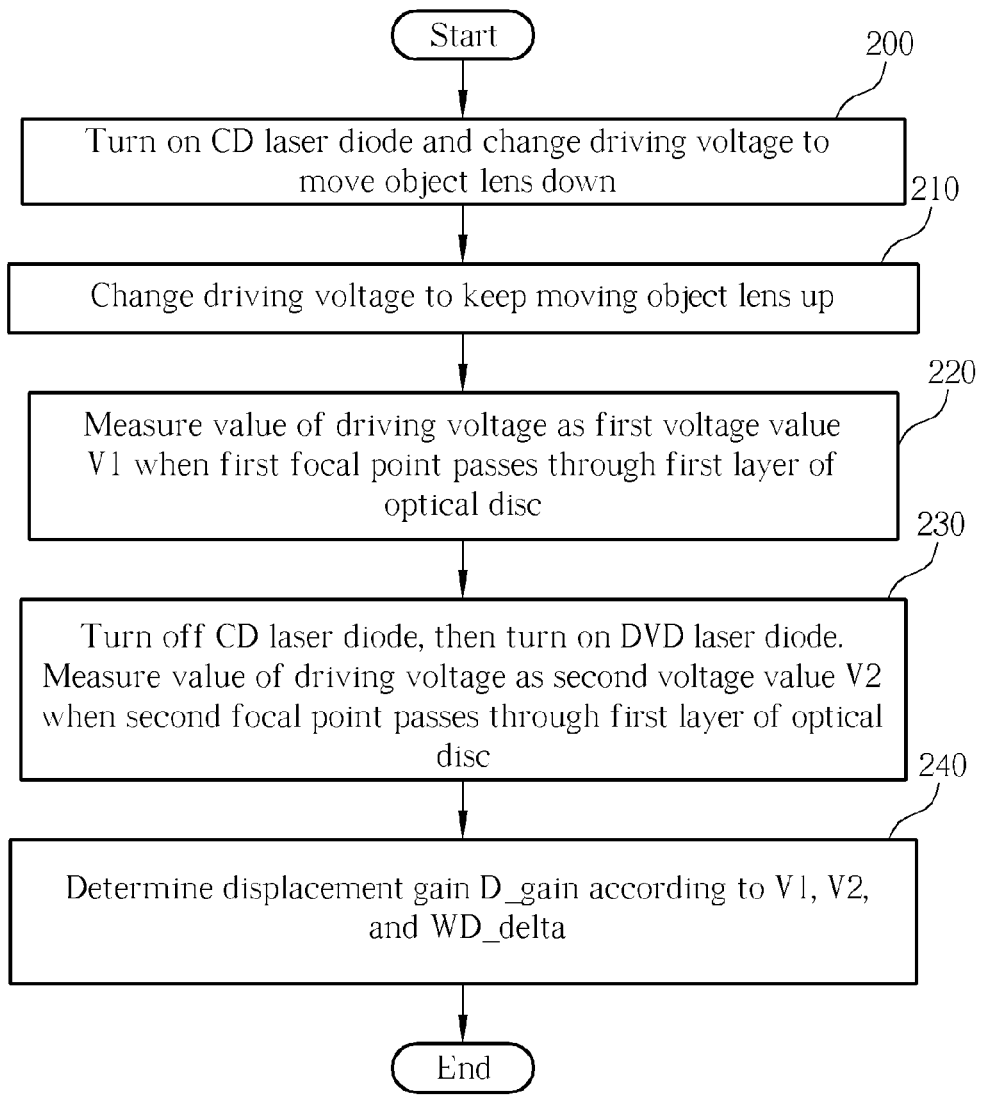
FIG. 2 is a flow chart according to a first embodiment of the present invention.

FIG. 2 shows a flow chart according to a first embodiment of the present invention. The steps are described in more detail in the following.

Step 200: Turn on the CD laser diode. Change the driving voltage to move the object lens down until it reaches the lowest end. In this step, "move down" means to move the object lens away from the surface of the optical disc.

Step 210: Continue to change the driving voltage to keep moving the object lens up. In this step, "move up" means to move the object lens toward the surface of the optical disc.

Step 220: Determine whether the first focal point has passed through a first layer of the optical disc by inspecting the characteristics of a focus error signal FE. Measure the value of the driving voltage as a first voltage value V1 when the first focal point passes through the first layer of the optical disc. In this embodiment, when an s-curve is detected in the FE signal, it is considered that the first focal point has passed through the first layer of the optical disc. However, other servo control signals can also be used as basis to determine whether the first focal point has passed through the first layer of the optical disc. In addition, the first layer mentioned here could be a surface layer or a reflective layer.

Step 230: Turn off the CD laser diode, and then turn on the DVD laser diode. Determine whether the second focal point has passed through the first layer of the optical disc by inspecting the characteristics of the FE signal. Measure the value of the driving voltage as a second voltage value V2 when the second focal point passes through the first layer of the optical disc.

Step 240: Determine the displacement gain D_gain according to the V1, V2, and WD_delta. Here the displacement gain D_gain is the relationship between the displacement of the object lens corresponding to the change of the driving voltage.

Figure 3:
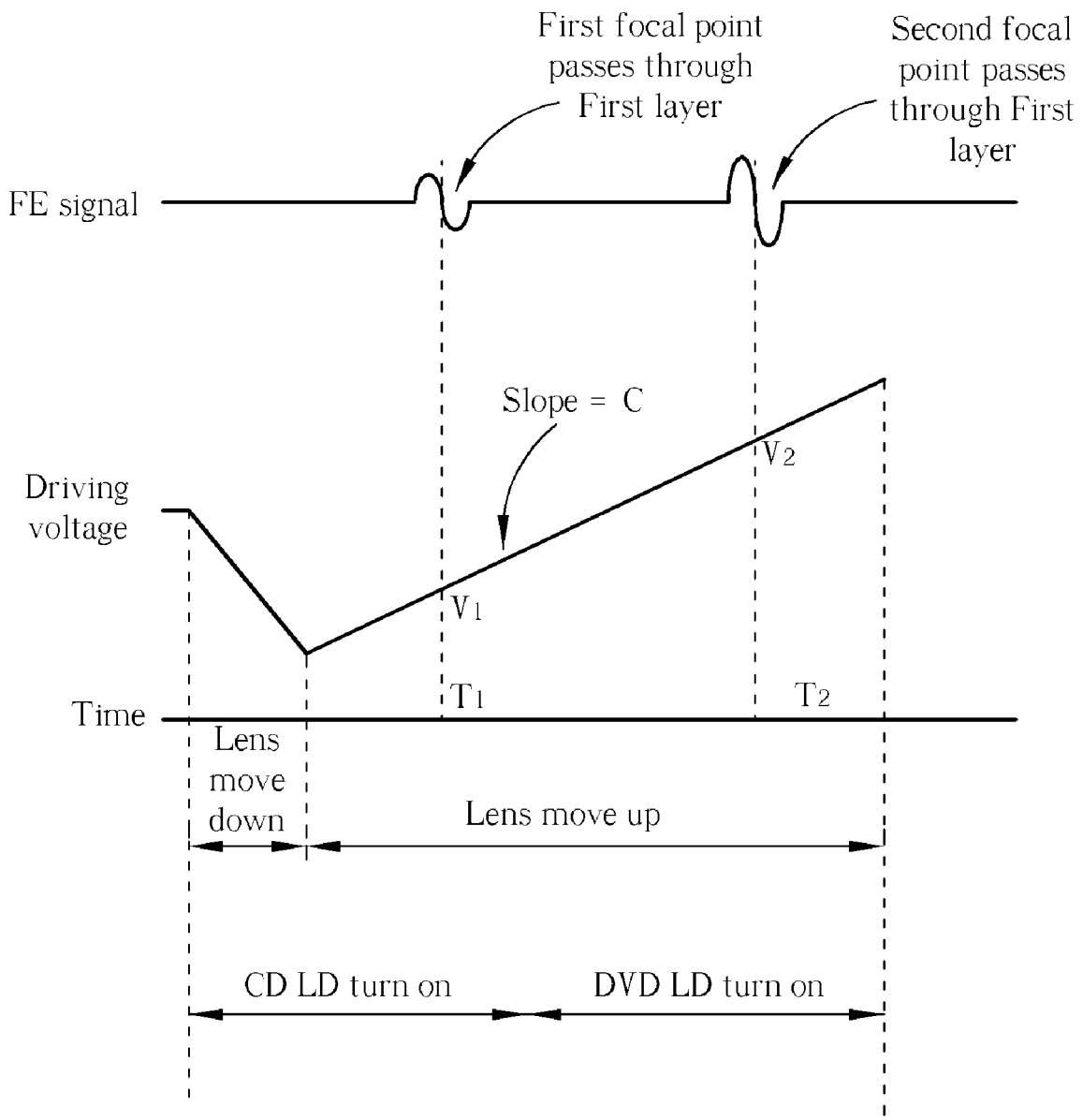
FIG. 3 is a diagram showing how the driving voltage and the focusing error signal, which is briefly called as FE signal, changes while the flowchart of FIG. 2 is being processed.

Clearly, since the location of the first layer remains unchanged during the above-mentioned steps, the moving distance of the object lens between the step 220 and 230 will substantially be equal to the first distance WD_delta. With the first distance WD_delta used as a basis, the value of the displacement gain D_gain can then be determined. Please refer to FIG. 3, FIG. 3 is a diagram showing how the driving voltage and the FE signal change while the flowchart of FIG. 2 is being processed.

If the first layer is a surface layer of the optical disc, the value of the displacement gain D_gain can be determined according to the following equation (1). If the first layer is a reflective layer of the optical disc, the value of the displacement gain D_gain can be determined according to the following equation (2).

$$D\_gain = WD\_delta/|V2-V1| \qquad \text{Equation 1}$$

$$D\_gain = WD\_delta/[|V2-V1| \times n] \qquad \text{Equation 2}$$

Please note that in the above equations it is assumed that a CD disc or a DVD disc has a common refractive index n for CD laser light and DVD laser light. Normally the value of n can be assumed to be 1.55. For convenience, the above-mentioned assumption will also be used in the following description. When a CD disc or a DVD disc has different refractive indices for CD laser light and DVD laser light, the equation 2 will not be correct. However, a more complex equation can be derived by a person of ordinary skill in the art with the working distance and focal distance of each laser light. The refractive index n can also be determined using experimental statistics. Hence the method provided by the present invention remains practicable.

Additionally, in the steps 220 and 230, it is also possible to measure a first time T1 when the first focal point passes through the first layer of the optical disc instead of measuring V1, and to measure a second time T2 when the second focal point passes through the first layer of the optical disc instead of measuring V2. The change of the driving voltage can be determined according to the time difference (T2−T1). When the change rate of the driving voltage with respect to time has a fixed slope, the deduction process becomes quite simple. The following paragraph is focused on the situation when the slope has a fixed value C.

If the first layer is a surface layer of the optical disc, the value of the displacement gain D_gain can be determined according to the following equation (3). If the first layer is a reflective layer of the optical disc, the value of the displacement gain D_gain can be determined according to the following equation (4). The value n in equation (4) is the reflective index inside the optical disc.

$$D\_gain=WD\_delta/[|T2-T1|\times C] \quad \text{Equation 3}$$

$$D\_gain=WD\_delta/[|T2-T1|\times C\times n] \quad \text{Equation 4}$$

The abovementioned first embodiment of the present invention can be used in an optical storage device having at least two laser diodes. Alternatively, the second embodiment of the present invention can be used in an optical storage device having at least one laser diode. The optical storage device implementing the second embodiment of the present invention contains a pickup head. The pickup head includes an object lens and a laser diode, which can be a CD laser diode or a DVD laser diode. The object lens focuses the laser light generated by the laser diode onto a focal point. A driving voltage (it could also be a driving current or other kind of control means) is used to control the movement of the object lens hence the location of the object lens can be controlled.

In this second embodiment, the specific distance is a distance that the s-curve of the FE signal has a linear region when the focal point passes through a first layer of the optical disc. The abovementioned first layer could be a surface layer or a reflective layer.

Figure 4:
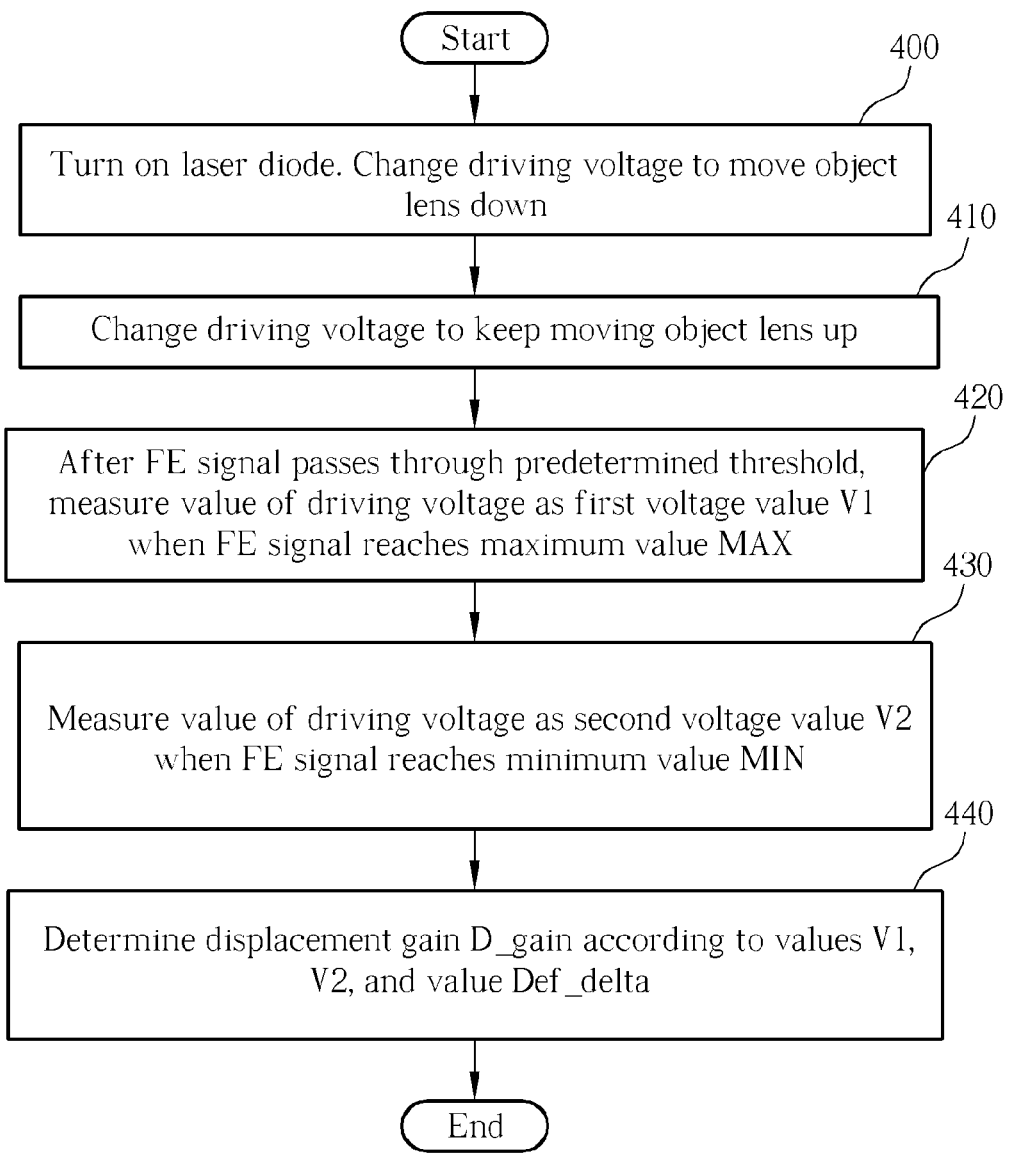
FIG. 4 is a flow chart according to a second embodiment of the present invention.

FIG. 4 shows a flow chart according to the second embodiment of the present invention. The steps are described in more detail in the following.

Step 400: Turn on the laser diode. Change the driving voltage to move the object lens down until it reaches the lowest end. In this step, "move down" means to move the object lens away from the surface of the optical disc.

Step 410: Continue to change the driving voltage to keep moving the object lens up. In this step, "move up" means to move the object lens toward the surface of the optical disc.

Step 420: Inspect the characteristics of the FE signal. After the FE signal passes through a predetermined threshold, measure the value of the driving voltage as a first voltage value V1 when the FE signal reaches a maximum value MAX. Using the predetermined threshold prevents an erroneous decision caused by noise from occurring. Additionally, other servo control signals could also be used here instead of the FE signal.

Step 430: Continue to inspect the characteristics of the FE signal. Measure the value of the driving voltage as a second voltage value V2 when the FE signal reaches a minimum value MIN. The region that the FE signal changes from MAX to MIN can be viewed as the linear region.

Step 440: Determine a displacement gain D_gain according to the values V1, V2, and a value Def_delta. Here the displacement gain D_gain is the relationship between the displacement of the object lens corresponding to the change of the driving voltage. The Def_delta is the distance that the object lens must move to allow the FE signal to pass through its linear region, and the value of Def_delta can determined through experimental statistics.

Figure 5:
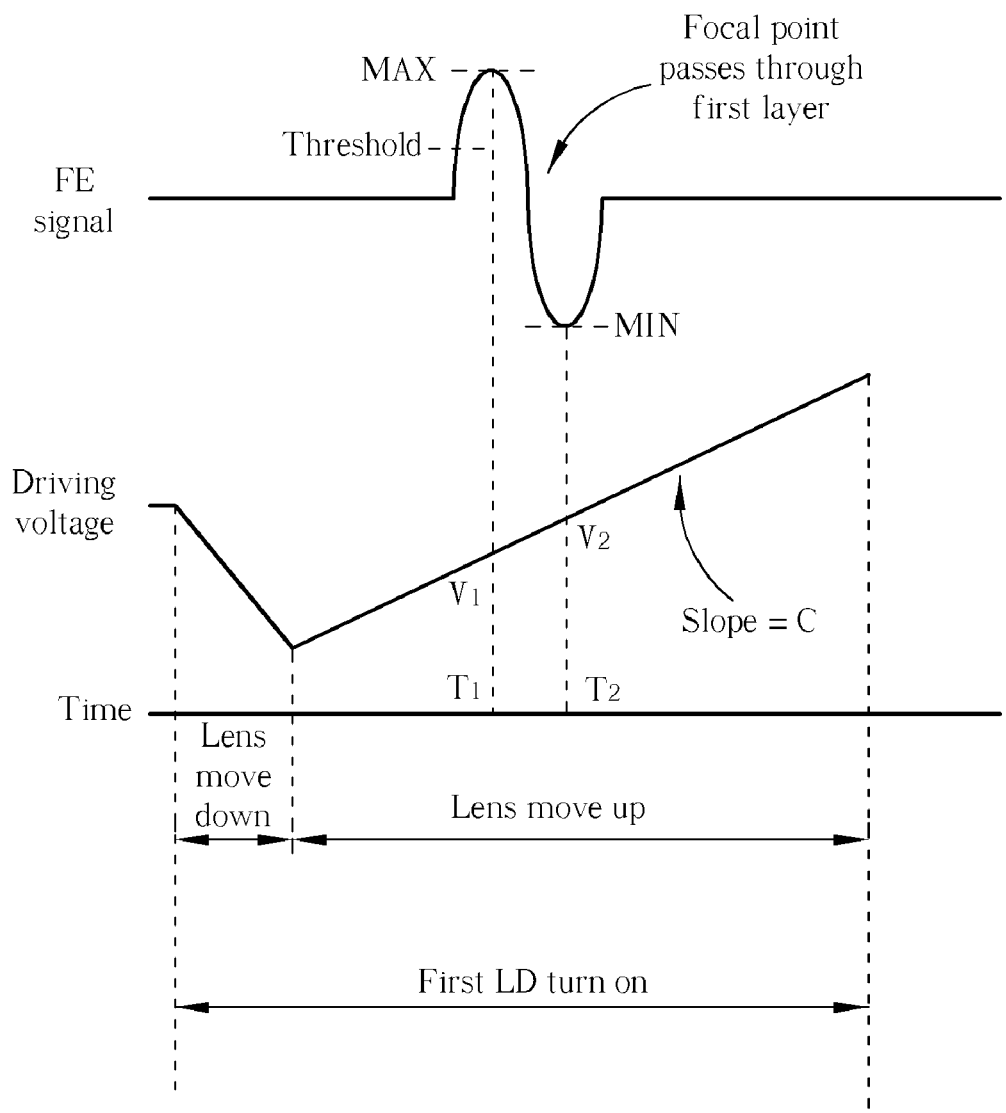
FIG. 5 is a diagram showing how the driving voltage and the FE signal change while the flowchart of FIG. 4 is being processed.

Please refer to FIG. 5. FIG. 5 is a diagram showing how the driving voltage and the FE signal change while the flowchart of FIG. 4 is being processed.

It is also possible to use the central part of the linear region instead of the whole linear region. The central part of the linear region refers to the region where the FE signal changes from (MAX×A) to become (MAX×B), wherein both A and B are smaller than ±1; or from (MAX+C) to become (MAX+D).

As a design choice, the designer can also use the whole s-curve instead of only the linear region of the s-curve. However, by using only the linear region, higher accuracy can be achieved.

If the first layer is a surface layer of the optical disc, the value of the displacement gain D_gain is determined according to the following equation (5). If the first layer is a reflective layer of the optical disc, the value of the displacement gain D_gain is determined according to the following equation (6). The value n in equation (6) is the reflective index inside the optical disc.

$$D\_gain=Def\_delta/|V2-V1| \quad \text{Equation 5}$$

$$D\_gain=Def\_delta/[|V2-V1|\times n] \quad \text{Equation 6}$$

Additionally, in the steps 420 and 430, it is also possible to measure a first time T1 when the FE signal reaches the value MAX instead of measuring V1, and to measure a second time T2 when the FE signal reaches the value MIN instead of measuring V2. The change of the driving voltage can be determined according to the time difference (T2−T1). When the change rate of the driving voltage with respect to time has a fixed slope, the deduction process will become quite simple. The following paragraph is focused on the situation when the slope has a fixed value C.

If the first layer is a surface layer of the optical disc, the value of the displacement gain D_gain is determined according to the following equation (7). If the first layer is a reflective layer of the optical disc, the value of the displacement gain D_gain is determined according to the following equation (8). The value n in equation (8) is the reflective index inside the optical disc.

$$D\_gain=Def\_delta/[|T2-T1|\times C] \quad \text{Equation 7}$$

$$D\_gain=Def\_delta/[|T2-T1|\times C\times n] \quad \text{Equation 8}$$

By using the method provided by the present to determine the exact value of the displacement gain of the focusing actuator of a particular optical storage device, the optical storage device can be calibrated. The optical disc identification procedure or layer jump procedure would be controlled more accurately. In addition, the determined displacement gain can also be used by the controller(s) of the optical storage device to process frequency response calibration.

Please note that the abovementioned moving direction in each step can also be reversed, that is, to first move the object lens up and then move it down.

Figure 6:
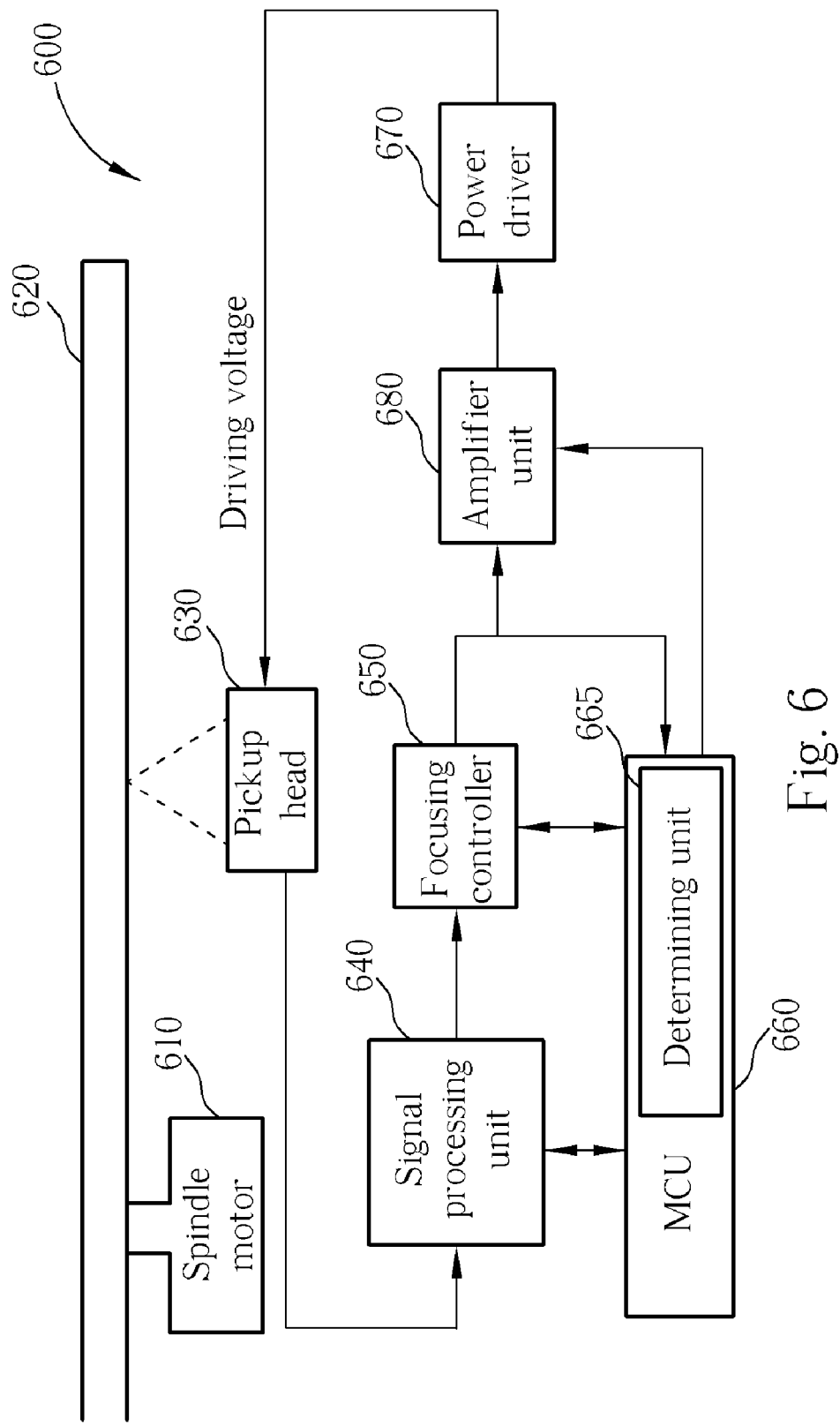
FIG. 6 is a block diagram of an optical storage device according to the present invention.

FIG. 6 shows an optical storage device 600 according to the present invention, which is capable of measuring a displacement gain through the abovementioned method. The optical storage device 600 contains a spindle motor 610, an optical disc 620, a pickup head 630, a signal processing unit 640, a focusing controller 650, a micro controller unit (MCU) 660, a power driver 670, and an amplifier unit 680. The pickup head 630 includes an object lens and a focusing actuator. The focusing actuator controls the location of the object lens according to a driving voltage generated by the power driver 670. Different from that of the prior art, the micro controller unit 660 of the optical storage device 600 includes a determining unit 665, which determines the displacement gain of the focusing actuator by using the method provided by the present invention. In addition, the micro controller unit 660 can also use the displacement gain determined by the determining unit 665 to calibrate the optical storage device 600.

Disregarding the amplifier unit 680, after the displacement gain is determined, each component of the closed loop formed by the pickup head 630, the signal processing unit 640, the focusing actuator 650 and the power driver 670 can be calibrated. However, in this embodiment there is an amplifier unit 680 located between the focusing controller 650 and the power driver 680. To allow the micro controller unit 660 to adjust the amplifier unit 680 directly, it is easier to implement the system architecture shown in FIG. 6. Additionally, although the determining unit 665 is located in the micro controller unit 660, it is also possible to design the determining unit 665 as an isolated functional block.

In contrast to the prior art, the present invention measures the displacement gain of the focusing actuator of each unique optical storage device. After the displacement gain is determined, the optical storage device can be calibrated properly, hence corresponding control procedure becomes more accurate. In addition, the optical storage device according to the present invention comprises a determining unit, which determines a displacement gain for the optical storage device and the displacement gain can be used to calibrate the optical storage device. Hence related control procedures in the optical storage device are more accurate than that of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used in an optical storage device comprising a pickup head, wherein the pickup head comprises an object lens, a first light source, and a second light source, the object lens focuses laser light generated by the first light source onto a first focal point or focuses laser light generated by the second light source onto a second focal point, the first focal point is a predetermined distance from the second focal point, a driving control effort is used to change a location of the object lens, and the method is used to determine a relationship between the difference of the object lens location and the driving control effort, the method comprising:

(a) turning on the first light source;
(b) providing the driving control effort to move the object lens;
(c) measuring a first parameter when the first focal point passes through a predetermined layer of an optical disc;
(d) turning off the first light source and turning on the second light source;
(e) measuring a second parameter when the second focal point passes through the predetermined layer of the optical disc; and
(f) determining the relationship between the difference of the object lens location and the driving control effort according to the predetermined distance, the first parameter, and the second parameter.

2. The method of claim 1, wherein the first parameter is a first driving control effort value of the driving control effort when the first focal point passes through the predetermined layer of the optical disc, and the second parameter is a second driving control effort value of the driving control effort when the second focal point passes through the predetermined layer of the optical disc.

3. The method of claim 2, wherein the predetermined layer is a surface layer of the optical disc, and in step (f):
the relationship between the difference of the object lens location and the driving control effort is determined according to a function of the predetermined distance and a driving control effort difference;
wherein the driving control effort difference is a difference value between the second driving control effort value and the first driving control effort value.

4. The method of claim 3, wherein the relationship is determined according to an equation as below:
$D\_gain = WD\_delta/|V2-V1|$, where $D\_gain$ represents the relationship, $WD\_delta$ represents the predetermined distance, $V2$ represents the second driving control effort value, $V1$ represents the first driving control effort value, and $|V2-V1|$ represents the driving control effort difference.

5. The method of claim 2, wherein the predetermined layer is a reflective layer of the optical disc, and in step (f):
the relationship between the difference of the object lens location and the driving control effort is determined according to a function of the predetermined distance, a driving control effort difference and a reflective index;
wherein the driving control effort difference is a difference value between the second driving control effort value and the first driving control effort value.

6. The method of claim 5, wherein the relationship is determined according to an equation as below:
$D\_gain = WD\_delta/[|V2-V1| \times n]$, where $D\_gain$ represents the relationship, $WD\_delta$ represents the predetermined distance, $V2$ represents the second driving control effort value, $V1$ represents the first driving control effort value, $n$ represents the reflective index, and $|V2-V1|$ represents the driving control effort difference.

7. The method of claim 1, wherein the first parameter is a first time when the first focal point passes through the predetermined layer of the optical disc, the second parameter is a second time when the second focal point passes through the predetermined layer of the optical disc, and in step (b) the change rate of the driving control effort with respect to time is a first slope.

8. The method of claim 7, wherein the predetermined layer is a surface layer of the optical disc, and in step (f):
the relationship between the difference of the object lens location and the driving control effort is determined according to a function of the predetermined distance, a time difference and the first slope;
wherein the time difference is a difference value between the second time and the first time.

9. The method of claim 8, wherein the relationship is determined according to an equation as below:
$D\_gain = WD\_delta/[|T2-T1| \times C]$, where $D\_gain$ represents the relationship, $WD\_delta$ represents the predetermined distance, $T2$ represents the second time, $T1$ represents the first time, $C$ represents the first slope, and $|T2-T1|$ represents the time difference.

10. The method of claim 7, wherein the predetermined layer is a reflective layer of the optical disc, and in step (f):
the relationship between the difference of the object lens location and the driving control effort is determined according to a function of the predetermined distance, a time difference, a reflective index and the first slope;
wherein the time difference is a difference value between the second time and the first time.

11. The method of claim 10, wherein the relationship is determined according to an equation as below:
$D\_gain = WD\_delta/[|T2-T1| \times C \times n]$, where $D\_gain$ represents the relationship, $WD\_delta$ represents the predetermined distance, $T2$ represents the second time, $T1$ represents the first time, $n$ represents the reflective index, $C$ represents the first slope, and $|T2-T1|$ represents the driving control effort difference.

12. An optical storage device comprising:
a pickup head including an object lens, a first light source, and a second light source; the object lens for focusing laser light generated by the first light source onto a first focal point or focusing laser light generated by the second light source onto a second focal point, and the first focal point being a predetermined distance from the second focal point;
a power driver generating a driving control effort for changing a location of the object lens; and
a determining unit coupled to the power driver for determining a relationship between the difference of the object lens location and the driving control effort by turning on the first light source, utilizing the driving control effort to move the object lens, measuring a first parameter when the first focal point passes through a predetermined layer of an optical disc, turning off the first light source and turning on the second light source, measuring a second parameter when the second focal point passes through the predetermined layer of the optical disc, and determining the relationship between the difference of the object lens location and the driving control effort according to the predetermined distance, the first parameter, and the second parameter.

13. The optical storage device of claim 12, wherein the first parameter is a first driving control effort value of the driving control effort when the first focal point passes through the predetermined layer of the optical disc, and the second parameter is a second driving control effort value of the driving control effort when the second focal point passes through the predetermined layer of the optical disc.

14. The optical storage device of claim 13, wherein the predetermined layer is a surface layer of the optical disc, and the determining unit is further for determining the relationship between the difference of the object lens location and the driving control effort according to a function of the predetermined distance and a driving control effort difference;
wherein the driving control effort difference is a difference value between the second driving control effort value and the first driving control effort value.

15. The optical storage device of claim 14, wherein the determining unit is further for determining the relationship according to an equation as below:
D_gain=WD_delta/|V2−V1|, where D_gain represents the relationship, WD_delta represents the predetermined distance, V2 represents the second driving control effort value, V1 represents the first driving control effort value, and |V2−V1| represents the driving control effort difference.

16. The optical storage device of claim 13, wherein the predetermined layer is a reflective layer of the optical disc, and the determining unit is further for determining the relationship between the difference of the object lens location and the driving control effort according to a function of the predetermined distance, a driving control effort difference and a reflective index; wherein the driving control effort difference is a difference value between the second driving control effort value and the first driving control effort value.

17. The optical storage device of claim 16, wherein the determining unit is further for determining the relationship according to an equation as below:
D_gain=WD_delta/[|V2−V1|×n], where D_gain represents the relationship, WD_delta represents the predetermined distance, V2 represents the second driving control effort value, V1 represents the first driving control effort value, n represents the reflective index, and |V2−V1| represents the driving control effort difference.

18. The optical storage device of claim 12, wherein the first parameter is a first time when the first focal point passes through the predetermined layer of the optical disc, the second parameter is a second time when the second focal point passes through the predetermined layer of the optical disc, and the change rate of the driving control effort with respect to time is a first slope.

19. The optical storage device of claim 18, wherein the predetermined layer is a surface layer of the optical disc, and the determining unit is further for determining the relationship between the difference of the object lens location and the driving control effort according to a function of the predetermined distance, a time difference and the first slope;
wherein the time difference is a difference value between the second time and the first time.

20. The optical storage device of claim 19, wherein the determining unit is further for determining the relationship according to an equation as below:
D_gain=WD_delta/[|T2−T1|×C], where D_gain represents the relationship, WD_delta represents the predetermined distance, T2 represents the second time, T1 represents the first time, C represents the first slope, and |T2−T1| represents the time difference.

21. The optical storage device of claim 18, wherein the predetermined layer is a reflective layer of the optical disc, and the determining unit is further for determining the relationship between the difference of the object lens location and the driving control effort according to a function of the predetermined distance, a time difference, a reflective index and the first slope;
wherein the time difference is a difference value between the second time and the first time.

22. The optical storage device of claim 21, wherein the determining unit is further for determining the relationship according to an equation as below:
D_gain=WD_delta/[|T2−T1|×C×n], where D_gain represents the relationship, WD_delta represents the predetermined distance, T2 represents the second time, T1 represents the first time, n represents the reflective index, C represents the first slope, and |T2−T1| represents the driving control effort difference.

* * * * *